United States Patent [19]

Hanna

[11] 4,331,577
[45] May 25, 1982

[54] LATEX POLYMERIZATION PROCESS

[75] Inventor: Russell Hanna, South Charleston, W. Va.

[73] Assignee: Union Carbide Corporation, Danbury, Conn.

[21] Appl. No.: 210,732

[22] Filed: Nov. 26, 1980

Related U.S. Application Data

[63] Continuation-in-part of Ser. No. 80,068, Sep. 28, 1979, abandoned.

[51] Int. Cl.³ ............................................. C08F 2/24
[52] U.S. Cl. .................................... 524/819; 526/93; 526/330; 526/331; 524/834; 524/825
[58] Field of Search ............... 260/29.6 T, 29.6 R, 260/29.6 MQ, 29.6 TA, 29.6 ME, 93, 61; 526/200, 209, 214, 225

[56] References Cited

U.S. PATENT DOCUMENTS

| | | | |
|---|---|---|---|
| 3,492,283 | 1/1970 | Miller | 526/61 X |
| 3,501,440 | 3/1970 | Kamio | 526/61 X |
| 3,691,142 | 9/1972 | Petersen | 526/61 |
| 3,804,881 | 4/1974 | Bassett | 260/29.6 R |
| 4,035,329 | 7/1977 | Wiest | 260/29.6 T |
| 4,039,500 | 8/1977 | Bassett | 260/29.6 R |
| 4,111,876 | 9/1978 | Bailey | 260/29.6 RB |
| 4,123,405 | 10/1978 | Oyamada | 260/29.6 R |

Primary Examiner—C. A. Henderson
Attorney, Agent, or Firm—F. M. Fazio

[57] ABSTRACT

In producing an aqueous latex the reactor pressure and free monomers content in the aqueous phase of the reactor are controlled. This control is achieved by selective addition of the monomers mixture to the reactor in response to pressure variation and the maintenance of a monomer unsaturated condition in the reactor.

3 Claims, No Drawings

LATEX POLYMERIZATION PROCESS

This application is a continuation-in-part of application Ser. No. 80,068, filed on Sept. 28, 1979, by Russell J. Hanna now abandoned.

BACKGROUND OF THE INVENTION

The use of ethylene-containing aqueous latexes is of significant importance. Generally these latexes are produced at elevated pressures thus necessitating the use of special pressure resistant equipment. Of particular interest are the vinyl chloride-ethylene and vinyl acetate-ethylene latexes; in many instances in combination with other comonomers. Over the decades the technology has developed extensively from the early efforts exemplified, for example, in U.S. Pat. No. 2,497,291 to the more refined procedures employed in the production of such latexes in use today.

In order to achieve a desired instantaneous polymeric chemical composition, semi-continuous batch emulsion copolymerization reactions have long been carried out employing vinyl chloride, vinyl acetate or styrene in significant concentration in the monomers mixture (i.e. from about 40 weight percent or more). In many instances the reaction is carried out at atmospheric pressure with the mixed monomers fed into the reactor during the course of the polymerization, the objective being to hold the level of free monomers present in the system at as low a level as possible (relatively starved conditions) and force the copolymer produced to have a composition as similar to the monomers mixture feed as possible. The systems may or may not be below the saturation level of the monomers in the aqueous phase. Generally there is sufficient free radical initiator present to cause the monomers to react as rapidly as they are added, hence, the rate of polymerization is essentially equal to the rate of monomers mixture feed introduced to the reactor. If for any number of reasons the rate of polymerization is slower than the rate of monomers feed, the free monomers concentration will build, often with undesirable results; however, since so many of these systems are reacted at atmospheric pressure, no signal is normally generated to signify a slow increase in free monomer concentration in the reactor. Conversely, a semi-continuous batch emulsion copolymerization can be carried out by the utilization or addition of more and more initiator in order to make the polymerization reaction more and more starved; this, however, is not desirable because excess initiator will damage the latex properties and/or result in the formation of undesirable low molecular weight copolymer. Again, the degree of starvation is not normally known.

An example of a starved, semi-continuous polymerization reaction may be seen with reference to U.S. Pat. No. 3,423,353 for vinyl acetate based polymerizations in which a constant composition of copolymer is formed throughout the run by a continuous feed of a single monomers mixture whose compositional content remains unchanged during the feed. The feed is introduced continuously and is not controlled by either the pressure or the temperature in the reactor.

The procedure disclosed in U.S. Pat. Nos. 3,804,881, 4,039,500 and 4,111,876 differ from the above in a significant manner. In these references, the compositional content of the monomers present in the feed added to the reactor is continuously changing during the period that the monomers mixture is added to the reactor. This continually changing feed mixture is continuously added to the reactor for immediate polymerization and the copolymer produced, since there is essentially instantaneous reaction, is continually changing in compositional content and corresponding to the changing compositional content of the feed. Again, while the monomers feed is continuously added to the reactor, its rate of feed is not controlled by either the pressure or the temperature in the reactor but it is initially predetermined and maintained at a set, constant rate by the operator. In the three patents identified in this paragraph there is disclosed a process for producing non-uniform polymers by the technique of varying the compositional content of the monomers mixture added to the reactor by the use of primary and secondary feeds. The secondary feeds are added to the primary feeds to continually change the compositional content of the primary feed and this continually changing primary feed is essentially simultaneously added to the reactor and polymerized under such conditions that there is essentially instantaneous polymerization. The feed rate to the reactor is not controlled by pressure variations observed in the reactor, pre-set, predetermined uniform rates of addition are shown in each of the examples and there is no indication in the references that the rates of addition during a reaction vary or change in response to variations in the reactor pressure. Nor is there any indication of degree of saturation of the aqueous system in these continuous feed polymerization processes.

Other emulsion processes for producing vinyl chloride-ethylene or vinyl acetate-ethylene based copolymers generally operate either as a continuous process or as a semi-continuous batch process with ethylene overpressure in the reactor. The continuous process is exemplified by U.S. Pat. No. 4,035,329 that employs a series of filled reactors. In the process disclosed in this patent the reactors are initially filled with a preformed polymerized dispersion corresponding essentially to the dispersion that is to be produced and the temperature and pressure in the reaction system is set at the desired values. The reactant streams, including a preformed mixture of the monomers, are then added to the first reactor and passes through the entire reactor system. Simultaneously, the finished product leaves the reactor system in the same proportion or amounts as the reactant streams that were added; at all times the reaction system is completely full of liquids. Under the conditions employed, pressure cannot be used to measure the amount of monomers concentration, it is used basically as a means of controlling the reaction and maintaining full reactors. The pressure was not used to control the feed rate of reactants into the reactor.

A typical semi-continuous emulsion process for producing copolymers is that which is disclosed in U.S. Pat. No. 4,123,405, which relates to a process whereby monomer is initially charged to a reactor which is then pressurized with ethylene. Then a mixture of monomers is added at a fixed rate of feed while maintaining a fixed pressure; however, the supply of ethylene was stopped during this feed. In this reference there is no control over the ratio of ethylene in the monomers mixture and there is no teaching of control of rate of feed by the pressure in the reactor. The process disclosed teaches the feeding of a mixture at a fixed rate independent of the pressure in the reactor. One using such a process is faced with two issues. Initially, if the vinyl acetate/vinyl chloride content is very low, a low molecular weight copolymer having inferior mechanical properties is produced. Secondly, since the ethylene is not ratioed to the other monomers the entrance of the ethylene into the polymerization reaction requires diffusion from the vapor phase into the aqueous phase at a significant rate and exterior factors such as agitation and latex viscosity can significantly disrupt the flow of ethylene to the site of the polymerization and result in a reduced amount of ethylene in the copolymer produced.

As can be seen, the known art clearly demonstrates some of the problems that are still prevalent and demonstrates the need for further improvements that would enable one to carry out the process in such manner that there was improved control of the free monomers content in the reactor as well as control of the monomers content in the polymer itself. Further, if such improvements could be attained at significantly lower polymerization pressures, major savings in capitol equipment costs and investment could be attained.

SUMMARY OF THE INVENTION

It has now been found that aqueous latexes can be produced with improved reactor control and at significantly lower pressure by dissolving the ethylene with the other monomers to create essentially one monomers feed and feeding this mixed monomers solution to the reactor to yield a pressure below the saturation level of the monomers at the chosen temperature. This is accomplished by a method that comprises the steps of charging to the reactor an initial reactor charge, purging the reactor and sealing it, optionally adding an initial portion of the monomers mixture to the reactor, heating the contents of the reactor and then adding initiator and the balance of the monomers mixture at such rates that a preselected reactor pressure is maintained, and simultaneously maintaining a monomers starved condition in the aqueous phase of the polymerization reaction mixture to the extent that the predominant monomers, e.g. ethylene, vinyl chloride, vinyl acetate, vinyl propionate, are below the saturation level in the aqueous phase.

DESCRIPTION OF THE INVENTION

According to the present invention an aqueous emulsion polymerization process has been found for producing polymers containing from about 1 to about 30 weight percent of ethylene in which the major monomers charged, including the ethylene, are mixed and fed to the reactor such that the concentration of each monomer in the aqueous phase of the reaction is below its saturation point. Under these conditions, the preselected reactor operating pressure that is chosen can be maintained within narrow limits by control of the monomers feed to the reactor; this feed control in turn holds a low and essentially constant amount of free monomer in the reactor and maintains an aqueous phase in which the concentration of each monomer therein is below its saturation point. As a result, the monomer feed automatically follows the rate of polymerization and the polymer produced has essentially the same monomers content as the feed. The result is exceptional process control, which translates to a reproducible product. Further, the low free monomer content in the reactor contributes to safety of operation; and, the ability to set the pressure of operation substantially below the pressure heretofore used for the production of a similar polymer permits substantial investment economies in equipment and operation. The present process differs significantly from heretofore used processes, which have been operated under conditions that involved either a monomer-rich system, that is, a system in which the aqueous phase was saturated with one or more of the predominant monomers or a presumably starved system in which the liquid monomers were separated from the gaseous ethylene. Under monomer-rich conditions the addition of an incremental amount of monomers mixture with the same mole ratio as that of the undissolved monomers present in the reactor yields no significant increase in the system pressure because the vapor pressure in the reactor is at its maximum as dictated by the mole fractions of the various monomer components in the mixture at the given temperature.

The process of this instant invention, requires a monomers starved system in which the aqueous phase is not saturated with the monomers. Thus as an incremental amount of the monomers mixture is added, it dissolves and equilibrates between the polymer phase suspended in the emulsion, the aqueous phase of the emulsion, and the vapor phase. Since the monomers mixture contains ethylene, the incremental addition of the mixture to the monomers starved system causes an increase in the reactor pressure as the monomers concentration in the aqueous phase moves toward the saturation level. Conversely, the lack of monomers feed during the polymerization causes a loss of monomers in the latex particle and subsequently a loss of monomer from the aqueous phase which in turn re-equilibrates with the vapor phase to cause a drop in reactor pressure. Thus, by adjusting the feed of monomers mixture one controls the reactor pressure and maintains the degree of unsaturation of the monomers in the aqueous phase.

Several unexpected advantages were observed by the use of this instant process. The improvement in relation to the prior art lies in the inclusion of the ethylene in the mixed monomers mixture that is fed into the reactor; hence, the ethylene enters the polymerization reaction firmly ratioed to the other monomers and in the dissolved or liquid form rather than as a gas. This leads to an unexpected and surprisingly rapid dissolution of the ethylene in the latex dispersion as contrasted to a highly variable diffusion rate of ethylene from the vapor phase when ethylene is added separately rather than in the monomers mixture in accord with this invention. A further unexpected improvement was the ease of utilization of the vapor pressure generated in the vapor phase of the reaction system to sense the amount of free monomer present if the monomer in the aqueous phase is present at a level below its saturation level in the aqueous phase. This then allows selection of a preselected reactor pressure to control the amount of free monomer present in the system and hence control molecular weight; it also permits use of the system's pressure to control the feed of the monomer to equal that of the polymerization reaction and minimizes the possibility of having a system containing significant quantities of unreacted monomers present over an appreciable period of time. When the pressure in the reactor rises above the preselected reactor pressure (at constant temperature) the monomers feed is slowed or stopped until the pressure returns to the preselected value. If the pressure in the reactor falls below the preselected value, additional feed of monomers mixture beyond the rate of use of the monomers by the polymerization reaction is resumed or sustained so as to return the pressure to the preselected desired level. It has been observed that the reactor pressure is unexpectedly sensitive to the ethylene dissolved in the aqueous phase; hence a tight control of monomer feed to match the rate of polymerization is easily attained. Further, unlike the known monomer-rich emulsion polymerization such as is described in U.S. Pat. No. 4,123,405, the pressure in our process can be arbitrarily set at any value below the point of saturation of the aqueous system. If a monomer-rich system at 45° C. yields a pressure of 1000 psig to yield a polymer of a given composition, the same composition of matter may be obtained by the process of this invention at that temperature by operating the system at below saturation conditions at either 900 psig, 800 psig or 700 psig. The polymer composition obtained by the instant process will be essentially the same regardless of the pressure because the monomers feed follows the rate of polymerization with a minimum of free monomers thus what is fed must be essentially the composition of that polymerized. If a polymerization to yield a specified polymer composition is monomer-rich at 1000 psi and 45° C. but is operated such that the predominant monomers are below their saturation level in the aqueous phase and at a lower pressure to yield the same composition, one would find that the monomers concentration in both the aqueous phase and dissolved in the latex particle became lower as the operating pressure is decreased. This reduced monomer concentration can lead to a reduced rate of polymerization and a lower molecular weight, but the composition of matter will still be essentially the same, as exemplified in Examples 3 and 4. Further it was also found that given a fixed operating temperature and a required composition of matter, the ability to choose a reactor operating pressure using the instant monomers starved process significantly below that required by a similar monomer-rich emulsion polymerization means that significant savings in capital investment may be attained. In brief, therefore, the instant aqueous phase monomers unsaturation process in comparison to the generally used processes yields improved safety because of a very low monomer concentration throughout the run, excellent process and compositional control, and the expectation of reduced investment.

The initial reactor charge is either water or a mixture of water with one or more of the additives conventionally present in an emulsion polymerization reaction. Such additives are well known to those skilled in the art and include the protective colloids, surface active agents, buffers, reductants or oxidants, activators, seed latex or any of the other known additives, in the quantities conventionally employed. The initial reactor charge may also optionally contain one or more polymerizable ethylenically unsaturated monomers at a concentration up to about 75 weight percent of the total weight of the initial reactor charge.

Among the suitable protective colloids one can mention the synthetic polymers such as polyvinyl alcohols, partially hydrolyzed polyvinyl acetate (degree of hydrolysis approximately 88 to 98), polymethacrylic acid and its salts, polyvinyl pyrrolidones, salts and derivatives of olefin-maleic acid anhydride copolymers such as, for example, reaction products of alkali liquors, ammonia, amines or ethanolamine with copolymers of maleic acid anhydride and ethylene, isobutylene or styrene, polyacrylamides; cellulose derivatives which dissolve in water to form 0.05 to 1.5% by weight solutions at temperatures of from 40° to 80° C., such as methyl celluloses, methylethyl celluloses, carboxymethyl celluloses, hydroxyethyl celluloses, methylhydroxyethyl celluloses, hydroxypropylmethyl celluloses; natural substances such as vegetable rubber (for example gum arabic), alginates and the like. The protective colloids are used in quantities of from 0.05 to 1.5% by weight and preferably in quantities of from 0.2 to 0.8% by weight, based on the quantity of polymer.

The surface active agents which can be used are nonionic, anionic or a combination of both nonionic and anionic surface active agents. Suitable nonionic surface active agents include polyoxyethylene condensates some specific polyoxyethylene condensates which can be used include polyoxyethylene aliphatic ethers, polyoxyethylene hydroabietyl ether and the like; polyoxyethylene alkaryl ethers such as polyoxyethylene nonlphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and the tall oil acids; polyoxyethylene amide and amine condensates such as N-polyoxyethylene lauramide, and N-lauryl-N-polyoxyethylene amine and the like; and polyoxyethylene thioethers such as polyoxyethylene N-dodecyl thioether. A condensate of ethylene oxide with a hydrophobic base formed by condensing propylene oxide with propylene glycol is also suitable.

Examples of suitable anionic surface active agents include the alkali or ammonium alkyl benzene sulfonates ($R-C_6H_4-SO_3$-salts) having about 10 to 18 carbon atoms in the linear or branched alkyl radical, or mixtures thereof; alkali or ammonium alkylsulfonates having 8 to 20, preferably 10 to 18, carbon atoms in the linear or branched alkyl radical, or mixtures thereof; alkali or ammonium salts of sulfosuccinic acid esters ($ROOCCH_2CH(SO_3H)COOR$) having 4 to 18 carbon atoms, preferably 6 to 12 carbon atoms in the alcohol component, or mixtures thereof; fatty alcohol sulfates of the formula $R-O-SO_3Me$, where R represents a linear or branched alkyl radical with 10 to 18 atoms. Me is an alkali ion or ammonium ion $NR_4'$ (where $R'=H$, alkyl with 1 to 6 carbon atoms or $-CH_2CH_2OH$). However, it is also possible to use fatty alcohol sulfates or fatty alcohol sulfate mixtures with predominantly or exclusively secondary alkyl sulfates; sulfates of substituted polyglycol ethers and alkali salts of fatty acids. The surface active agents are used in quantites of from 0.1 to 5% by weight and preferably in quantities of from 0.2 to 3% by weight, based on the quantity of water added per unit of time.

The function of the buffer substances used in the process of this invention is to maintain a pH value of from 3.5 to 8.5, a pH value of from 3.5 to 6.0 being preferred for the polymerization of monomer mixtures rich in vinyl acetate, while a pH value of from 3.5 to 8.5 is preferred for monomer mixtures rich in vinyl chloride. The quantity in which the buffer substances are used is governed by the type and quantity of peroxides, reducing substances and hydrophilic comonomers used. In most cases, alkaline reaction additives should be used on account of the $H_3O^+$ ions formed, for example, during the decomposition of a persulfate. Additives of this kind include alkali hydroxides, alkali salts of carbonic acid, ammonium, borax (only where hydroxyethyl cellulose is used), alkali phosphates and alkali acetates.

A catalytic reagent is used in the process of this invention; when this catalyst is a redox system the two components of the redox system are maintained in separate feeds or charges until they have been added to the reactor, as is well known. These catalytic reagents are well known and various free-radical forming initiators can be used for carrying out the polymerization of the monomeric material suitable for use in the process of this invention one can mention the water-soluble inorganic peroxide compounds, for example persulfates (such as ammonium, sodium or potassium persulfate) and/or hydrogen peroxide. However, it is also possible to use water-soluble compounds of the azodinitrile, peroxy acids, peroxy ester, diacyl perioxides, peroxy mono- and peroxy dicarboxylic and ester, of the dialkyl and diaryl peroxide and of the alkyl hydroperoxide types, which have adequate solubility in water through suitable substitution with hydrophilic groups. In addition to the aforementioned peroxide compounds, it is possible to use the known reducing substances to accelerate polymerization (redox activation), especially at polymerization temperatures below 70° C. Substances suitable for this purpose include sulphur compounds with a low oxidation state such as sulfites, hydrogen sulfites, metabisulfites, thiosulfates, formaldehyde sulfoxylates, sulfinic acids, reducing nitrogen compounds such as hydroxylamine and hydroxylammonium salts, hydrazine and hydroxylammonium salts, polyamines; and, finally, reducing saccharides such as sorbose, glucose, fructose or endiols, such as ascorbic acid. The quantity in which the initiators are used amounts to from 0.1 to 2.5% by weight and preferably to from 0.5 to 1.5% by weight, based on monomer.

In addition, the catalyst system can be further sensitized with activators such as heavy metal compounds, sometimes in the form of metal chelate complexes, iron, copper, cobalt, molybdenum, nickel and cerium representing suitable heavy metals. Preferred complex formers include ethylene diamine, diethylene tetramine, triethylene tetramine or carboxymethyl hydroxyalkyl-, carboxymethyl derivatives of ammonia, ethylene diamine, diethylene tetramine, for example nitrilotriacetic acid and ethylenediamine tetraacetic acid.

As previously indicated, the initial reactor charge can additionally contain one or more polymerizable ethylenically unsaturated monomers. These monomers can be the same as those present in the monomers feed subsequently fed to the initial reactor charge or they can be different monomers. Any of the monomers known to those skilled in the art as useful in the production of latexes can be used; these are so well known that there is no need to list them here for one of ordinary skill in the art to comprehend which monomers are suitable; the literature is replete with patents and other publications in which they are identified.

To add latex stability, hydrophilic monomers may also be copolymerized. Typical examples are acids such as acrylic, methacrylic, itaconic, maleic, fumaric, and vinyl sulfonic. The salts of these acids may also be used and the half-esters of maleic and fumaric. Compounds specifically designed to be polymerizable surfactants may also be utilized.

While the process of this invention has been exemplified with vinyl chloride and vinyl acetate as the major monomers, the emulsion polymerization of 1 to 30 percent of ethylene with other monomers as a significant component is also possible. Such systems as acrylates and methacrylates could be utilized. Regardless of the nature of the major monomer besides ethylene, all manner of other monomers may be added into the polymerization for the special benefits desired. The use of monomers designed to stabilize the latex has been discussed above. Other monomers which lead to other functionality such as hydroxyls, carboxyls and oxiranes for postpolymerization reactions may be added. Examples of these are hydroxyethyl acrylate, acrylic acid, and glycidyl methacrylate. Other specialized monomers for adhesion and molecular weight building may also be added. Examples of the former are shown in U.S. Pat. Nos. 4,104,220, and 3,404,114. Examples of molecular weight builders are N-methylol acrylamide, N-isobutoxymethyl acrylamide, trimethylol propane triacrylate, pentaerythritol triacrylate, 1,6-hexanediol diacrylate, neopentyl glycol diacrylate, allyl methacrylate, divinyl benzene, diallyl maleate, and diallyl phthalate. Further additional properties may be attained with the addition of other common monomers such as alkyl acrylate, alkyl methacrylates, vinyl ester, dialkyl maleates, dialkyl fumarates, acrylamides, vinyl halides, acrylonitrile, and olefins.

Small amounts of water-soluble solvents such as methanol may also be added, especially if very water-insoluble monomers, such as vinyl stearate, are used. In terms of the process it has generally been advantageous to maintain a means polymerization temperature of about 50° C. although a temperature of from about 30° to 80° C. is acceptable. Temperatures of from 70° to 75° C. are suitable for an initiator based on peroxydisulfate.

The reactor pressure required depends on the amount of ethylene desired in the product, the operating temperature, the major comonomer involved, and the degree to which the process is monomers starved. Pressures from 50 to 2000 psig may be utilized although pressures from 100 to 1500 psig are preferred.

In carrying out the process of this invention the initial reactor charge is charged to the reactor and then the reactor is purged by usual procedures to remove atmospheric gases and sealed. One such procedure is to purge with ethylene. After purging one can optionally add an initial portion of the monomers mixture to the reactor prior to heating. This addition is not a prerequisite in the process; however, when such initial portion is added it can constitute up to about 30 percent of the total weight amount of monomers mixture to be added to the reactor during the course of the polymerization reaction, preferably this amount, when employed will be from 1 to 15 percent thereof.

The monomers feed mixture contains, based on the total weight of the mixture, from about 1 to about 30 weight percent of ethylene, preferably from about 5 to 25 weight percent, from about 40 to about 99 weight percent of vinyl chloride or vinyl acetate or vinyl propionate or mixtures thereof, preferably from about 6 to 90 weight percent, and from about 0 to 20 weight percent of one or more other polymerizable monomer, preferably from about 0 to 5 weight percent, which polymerizable monomer contains the ethylenically unsaturated group.

After addition of the initial portion of the monomers feed to the reactor, if such initial portion is to be added, or when not added after the addition of the initial reactor charge to the reactor, the contents of the reactor are heated to from about 30° to about 80° C. As a result, the pressure in the sealed reactor increases to as much as 2000 psig; at this time the reactor may be either in a monomers-rich or monomers starved condition dependent upon the amount of the initial portion of the monomers mixture added to the reactor prior to heating. At this stage either condition is acceptable.

The polymerization is then initiated by the addition of oxidant or reductant or both. At this point a feed of the mixed monomers mixture is begun to the reactor at a controlled rate which will soon hold the pressure essentially constant at a preselected and predetermined level. Significant agitation is maintained to disperse and dissolve this monomer in the aqueous phase. Control of the system is most advantageously attained if all or most of the monomers, including the ethylene, are contained in the same storage feed vessel. This insures that the ratio of ethylene fed to the other monomers fed remains essentially constant and that ethylene is in dissolved or liquid form. Therefore, since in the starved polymerization system the amount of free monomer is very low, the composition of matter polymerized will very closely approximate the composition of the monomers fed. The monomers mixture fed may be adjusted in composition as the polymerization proceeds, but care must be taken that such shifts in monomer mixture feed composition do not allow the reactor system to slip into a monomer-rich condition. Normally a feed of initiator or initiator/reductant is continued as the polymerization proceeds. Other minor components such as surfactant and specialty monomers may also be fed without necessarily being in proportion to the main monomer stream, if desired. The monomers mixture feed rate is initially controlled to obtain a preselected pressure value in the reactor, whether this value be 100 psig or 1,000 psig, and its feed rate is then continued at a rate to control and maintain said preselected reactor pressure and to simultaneously maintain a monomers starved condition in the aqueous phase of the polymerization reaction mixture. The addition of monomers mixture and catalyst components is continued until the desired solids content is achieved, which can be as high as 75 percent or more. Since, at this point, the system still remains monomers starved, little residual monomer exists. The continued addition of free-radical generators following the cessation of monomers mixture feed will assist in an even further reduction of residual unreacted monomer. At this point the system may be gradually depressurized in the reactor or blown to another vessel to allow rapid evolution of the unreacted ethylene. Continued efforts at reducing residual unreacted monomer may be taken here either by chemical or mechanical/thermal methods.

While the process described here most effectively mixes most of the monomers, including the ethylene, in one tank to insure that the feed ratio of ethylene to the other major monomers is essentially constant and to utilize the ethylene dissolved in the other monomers, or in liquid form, this operating technique may be achieved by rationing separate streams to gain the same effect. For instance if one wished to operate in a monomers starved state and have the monomer feed follow the rate of polymerization via pressure control, a loss of pressure in the reactor would call for additional monomer which would then be added from a low-pressure tank containing, for example a mixture of vinyl chloride, vinyl acetate or a mixture thereof, the amount fed would then, by the proper automation using readily available equipment, permit the desired amount of ethylene to be injected into the monomer feed line to retain the desired ratio of ethylene to the vinyl monomers. However, the preferred technique of operation is to mix the ethylene with the major monomers to form a liquid monomers mixture for the monomer feed since operationally the technique is more simple and less prone to error. The technique, however, has the disadvantage of requiring a monomer feed tank which must have the ability to withstand a substantial pressure, normally in the range of 50 to 400 psig at ambient temperature conditions. Such a mix, however, need not be a solution but may be an emulsion, a common procedure in some emulsion polymerizations.

The following examples serve to further define the invention.

EXAMPLE 1

A jacketted, glass-lined, pressure-resistant polymerization reactor, equipped with an agitator, was charged with a solution of 12,258 parts of water, 242 parts of sodium lauryl sulfate, 760 parts of ethoxylated nonylphenol having an average of 9 ethyleneoxy units, 58.5 parts of hydroxyethyl cellulose as protective colloid, 61 parts of sodium acetate, 101 parts of sodium bisulfite and 0.2 part of ferrous chloride activator. This initial reactor charge was purged with ethylene and the reactor sealed.

A monomers mixture was prepared containing 65 weight percent vinyl chloride, 16 weight percent vinyl acetate and 19 weight percent ethylene.

Also prepared was an oxidant solution containing 293 parts t-butyl hydroperoxide, 310 parts of acrylic acid, sufficient sodium hydroxide to raise the pH to 4.5 and 4,600 parts of water.

In addition a reductant solution was prepared containing 359 parts of sodium bisulfite, 179 parts of sodium sulfite, 0.5 parts of ferrous chloride and 4,610 parts of water.

A 1,839 parts portion of the monomers mixture and 3,647 parts of ethylene were added to the purged initial reactor charge and the contents were stirred and heated to 39° C.; this resulted in a pressure rise to 590 psig. At the time the temperature reached 39° C. the feed of oxidant solution and reductant solution at a rate of 15 part per minute each was begun. The polymerization reaction started immediately, with its temperature rising to 47° C. and the pressure to 610 psig. Five minutes after the polymerization began, the monomers mixture feed was begun at a feed rate of 225 parts per minute; in 15 minutes the pressure rose to 650 psig at which point the monomers mixture feed was adjusted to maintain a pressure of 650 psig at 45° C. and a monomers starved condition in the aqueous phase of the polymerization reaction mixture. During the last period of the feed, the pressure fluctuated from 580 to 650 psig. A total of 29,730 parts of monomers mixture was added in this manner over a feed time of 175 minutes; 15 minutes later the feeds of oxidant solution and reductant solution were stopped and the reaction mixture was simultaneously cooled and vented to atmospheric pressure over a period of 80 minutes.

The total amount of oxidant solution added was 2,600 parts and total reductant solution added was 2,530 parts.

The latex produced had a total solids content of 56.4 weight percent. Based on the total solids, the interpolymer contained 63.1 weight percent of vinyl chloride, 16.0 weight percent of vinyl acetate and 16.4 weight percent of ethylene, the latter being calculated from material balance. The polymer had a Tg of −1° C. The interpolymer composition compares closely to the composition of the monomers mixture fed to the reactor. Since the polymerization was carried out under starved conditions, there was a low level of free monomer in the reactor during the reaction. Consequently, the composition of the interpolymer produced was essentially the same throughout the reaction because the interpolymer produced was essentially the same as the composition of the monomers mixture fed to the reactor.

The product produced in this Example 1 can be compared to that produced in Example I of U.S. Pat. No. 3,830,761, which produced an interpolymer containing 61.6 weight percent of vinyl chloride, 15.4 weight percent of vinyl acetate and 17.1 weight percent of ethylene. It is to be noted that the procedure followed in U.S. Pat. No. 3,830,761 was carried out at much higher pressures, from essentially 900 to 1,025 psi.

The pressure differential of about 400 psig between Example 1 and the example of U.S. Pat. No. 3,830,761 is substantially caused because of the difference between starved and monomer-rich operation. In the example of U.S. Pat. No. 3,830,761, the higher pressure is largely caused because the initial monomer charge and subsequent feed exceed the solubility limit of one or more of the monomers in the aqueous phase and hence exerts the full vapor pressure of whatever that composition has become.

EXAMPLE 2

This example illustrates the control achieved over the interpolymer composition by operation under the controlled pressure and starved monomers conditions of the method of this invention. To a jacketted, glass-lined, agitator equipped, pressure-resistant vessel there was charged an initial reactor charge of 800 parts of water, 0.5 part of sodium dioctyl sulfo-succinate, 4 parts of sodium acetate and 0.013 part of ferrous chloride. This initial reactor charge was purged with ethylene and the reactor was sealed.

A monomers mixture was prepared containing 1,680 parts of vinyl chloride, 420 parts of ethylene, 0.8 part of sodium bis(tridecyl) sulfosuccinate and 12 parts of sodium dioctyl succinate.

An oxidant solution was prepared containing 12 parts of t-butyl hydroperoxide in 300 parts of water.

A reductant solution was prepared containing 27.5 parts of sodium bisulfite, 3 parts of sodium acetate, 0.008 part of ferrous chloride and 300 parts of water.

A surfactant solution was prepared containing 20 parts of sodium dioctyl sulfosuccinate, 40 parts of sodium dihexyl sulfosuccinate,, 0.7 part of sodium bis(-tridecyl) sulfosuccinate and 350 parts of water.

To the purged reactor there were added 167 parts of monomers mixture, 175 parts of ethylene and 20 parts of reductant solution, and the contents were stirred and heated to 50° C. At this point the pressure was 560 psig. The polymerization reaction was initiated by feeding the oxidant solution and reductant solution to the reactor at a rate of 0.92 part per minute for 10 minutes. The feed of monomers mixture at a rate of 10 parts per minute and the feed of surfactant solution at a rate of 1.25 parts per minute were initiated and continued at that rate for about 30 minutes until the reactor pressure reached 660 psig, the preselected pressure desired. At this stage the monomers mixture feed was controlled and adjusted at a rate of from 4 to 9 parts per minute to maintain a pressure of from 650 to 665 psig and a temperature of from 50° to 54° C. These feeds were continued for a total elapsed period of 334 minutes and then terminated. During this period oxidant solution was being fed in at an average rate of 0.92 parts per minute and reductant solution at as average rate of 0.95 parts per minute; this was continued for five minutes after termination of the monomers mixture and sufactant solution. The reactor was slowly depressurized and the latex was removed. A total of 1,883 parts of monomers, 310 parts of oxidant solution, 325 parts of reductant solution and 265 parts of surfactant solution were added.

The latex produced had a total solids content of 55.3 weight percent and the interpolymer had a Tg of 8° C. During the reaction samples were taken from the reactor and the interpolymer analyzed. It was observed that the amount of copolymerized ethylene was initially low because of the lack of sufficient ethylene in the initial reactor charge, but as the addition of monomers mixture continued the system became monomers starved and the monomers mixture fed almost immediately polymerized to produce an interpolymer approaching the same composition as the monomers mixture and the average composition of the polymer quickly approached the composition of the feed and continued to retain it. These results are tabulated below. The analysis appears to indicate a slightly lower level of vinyl chloride than expected; however, this is caused to some extent by the analytical technique used, which is strictly a chloride determination and does not take into account the additional components in the solids that are neither vinyl chloride or ethylene.

| | After Initiation of Monomers Mixture Feed | |
|---|---|---|
| Time Elapsed, Minutes | Monomers Mixture Fed, Parts | Vinyl Chloride Content of Interpolymer, % |
| 30 | 300 | 88.5 |
| 55 | 500 | 85.2 |
| 97 | 750 | 80.2 |
| 157 | 1,045 | 81.3 |
| 210 | 1,260 | 79.6 |
| 270 | 1,518 | 78.2 |
| 303 | 1,750 | 78.9 |
| 334 | 1,883 | 77.1 |

EXAMPLE 3

The reactor described in Example 2 was charged with an initial reactor charge of 922 parts of water, 69 parts of hydroxyethyl cellulose as protective colloid, 3.5 parts of the ethylene oxide adduct of nonylphenol having an average of 10 ethyleneoxy groups as surfactant, 0.5 part of sodium bicarbonate and 1 part of sodium acetate.

A monomers mixture was prepared containing 1,193 parts of vinyl acetate and 132 parts of ethylene.

An initiator solution was prepared containing 300 parts of water, 36.4 parts of ammonium persulfate and 2.7 parts of ammonium hydroxide.

After purging the reactor charge with ethylene, 140 parts of vinyl acetate were added to the initial reactor charge and the reactor was sealed and the contents heated to 70° C. Over a period of 20 minutes 25 parts of the initiator solution were added to begin the polymerization. At this time the feed of monomers mixture was begun at a rate of 23 parts per minute until the pressure reached 125 psig; this required about 22 minutes. At the time the pressure reached 125 psig the feed of monomers mixture was decreased and controlled and adjusted to an rate of from 63 to 107 parts per minute to hold the pressure at 125 psig while the temperature was held at from 77° C. to 82° C. The feeds were continued for 175 minutes during which time 1,297 parts of monomers mixture and 220 parts of initiator solution had been fed.

After termination of the feeds, the contents of the reactor were held at the same temperature for 45 minutes; polymerization of unreacted monomers continued and the pressure dropped to 93 psig. The reaction was cooled to room temperature, vented and the latex recovered. The latex had a 56.9 weight percent total solids. The copolymer had an ethylene content of 10.3 weight percent and a Tg of 10° C. The number average molecular weight was 23,300.

EXAMPLE 4

The procedure of Example 3 was repeated with several modifications; the ammonium hydroxide was omitted from the initiator solution, and the pressure was held by monomer feed to 80 psig. Due to the lower pressure, a lower monomer concentration was present in its reactor and, thus, the rate of reaction was much slower. The net result was that although all of the initiator solution was added over a period of 275 minutes, only 650 parts of the monomers solution was consumed. The recovered latex had a 38.9 percent solids content and the polymer had a Tg of 11° C. an indication that it contained about the same amount of ethylene as was incorporated in the polymer of Example 3. The number average molecular weight was 8,480.

What is claimed is:

1. In a method for controlling reactor pressure and free monomers content in the reactor during an emulsion polymerization reaction for the production of aqueous latex compositions, which method comprises the steps of:
   (a) charging to a reactor an initial reactor charge comprising water or a mixture thereof with one or more additives of the group comprising protective colloid, surfce active agent, buffer, reductant or oxidant, activator, polymerizable ethylenically unsaturated monomer, wherein said monomer comprises up to about 75 weight percent of said initial reactor charge;
   (b) purging said reactor of atmospheric gases and sealing said reactor;
   (c) introducing an initial portion of a monomers feed mixture to the initial reactor charge, said monomers feed mixture comprising, by weight, from about 40 to about 99 percent vinyl chloride, vinyl acetate or mixtures thereof, from about 1 to about 30 percent ethylene dissolved therein and from 0 to 20 percent of one or more other polymerizable vinyl monomer, said initial portion comprising from 0 to about 30 percent of the total amount of the monomers feed mixture added to the reactor during the course of the polymerization reaction;
   (d) introducing oxidant solution or reductant solution or both to the reactor contents at a feed rate whereby the polymerization reaction is initiated and thereafter commencing the addition of monomers feed mixture to the reactor contents;
the improvement of adding the monomers feed mixture defined in (c) in step (d) of the process to the reactor contents at a controlled feed rate at a preselected reaction temperature within the range of from about 30° to 80° C. to attain and maintain a preselected reactor pressure within the range of from 50 psig to 2,000 psig, said feed rate controlled by response to the preselected reactor pressure at which the polymerization is carried out and continued at the controlled rate to maintain and control said preselected reaction temperature and said preselected reaction pressure while simultaneously maintaining an essentially monomers unsaturated condition in the aqueous phase of the reaction mixture, whereby the concentration of each monomer in the aqueous phase of the reaction mixture is below its saturation point and whereby the polymer molecules produced in the aquoeus emulsion have essentially the same composition as the composition of the monomers feed mixture added to the reactor, and thereafter recovering the aqueous latex emulsion produced.

2. A process as claimed in claim 1, wherein said monomers mixture consists essentially of from about 60 to 90 weight percent vinyl chloride, vinyl acetate or mixtures thereof and from about 5 to 25 weight percent ethylene.

3. A process as claimed in claim 1, wherein said monomers mixture consists essentially of vinyl chloride and ethylene.

* * * * *

UNITED STATES PATENT AND TRADEMARK OFFICE
CERTIFICATE OF CORRECTION

PATENT NO. : 4,331,577
DATED : May 25, 1982
INVENTOR(S) : Russell Hanna, South Charleston, W. Va.

It is certified that error appears in the above-identified patent and that said Letters Patent are hereby corrected as shown below:

Column 8, Line 52, the range "6 to 90" should read ---60 to 90---.

Signed and Sealed this

Seventeenth Day of August 1982

[SEAL]

Attest:

GERALD J. MOSSINGHOFF

Attesting Officer    Commissioner of Patents and Trademarks